United States Patent [19]

Newsham et al.

[11] Patent Number: 5,776,374
[45] Date of Patent: Jul. 7, 1998

[54] CROSSLINKABLE THERMOPLASTIC AND CROSSLINKED THERMOSET NONLINEAR OPTICAL POLYMERIC COMPOSITIONS DERIVED FROM AROMATIC DIHYDROXY COMPOUNDS

[75] Inventors: Mark D. Newsham; Michael N. Mang; Robert J. Gulotty, Jr., all of Midland, Mich.; Dennis W. Smith, Jr., Lake Jackson, Tex.

[73] Assignee: The Dow Chemical Company, Midland, Mich.

[21] Appl. No.: 553,165

[22] Filed: Nov. 7, 1995

[51] Int. Cl.$^6$ .................... F21V 9/00; C08G 65/38
[52] U.S. Cl. .................... 252/582; 528/87; 528/96; 528/98; 528/99; 528/101; 528/104; 528/106; 528/205; 528/210; 528/219
[58] Field of Search .................... 252/582, 587; 359/326, 328; 528/86, 87, 96, 98, 99, 101, 104, 106, 205, 210, 219

[56] References Cited

U.S. PATENT DOCUMENTS

| | | | |
|---|---|---|---|
| 4,935,292 | 6/1990 | Marks et al. | 428/220 |
| 4,936,645 | 6/1990 | Yoon et al. | 350/96.14 |
| 4,985,528 | 1/1991 | Mignani et al. | 528/59 |
| 5,037,935 | 8/1991 | Gulotty et al. | 528/125 |
| 5,112,881 | 5/1992 | Mandal et al. | 522/117 |
| 5,170,461 | 12/1992 | Yoon et al. | 385/130 |
| 5,208,299 | 5/1993 | Bales et al. | 525/437 |
| 5,588,083 | 12/1996 | Boonstra et al. | 252/582 |
| 5,616,678 | 4/1997 | Beckmann et al. | 252/582 |

OTHER PUBLICATIONS

Jeng, R.J., et al., *J.M.S.—Pure Appl. Chem.*, "Novel Crosslinked Guest–Host System With Stable Second–Order Nonlinearity", A29(12), pp. 1115–1127 (1992).

Braja K. Mandal et al., *Makromol. Chem., Rapid Commun.*, "New Photocrosslinkable Polymers For Second–Order Nonlinear Optical Processes", 12, pp. 607–612 (1991).

Miller, R.D. et al., *Macromolecules*, Donor–EmbeddedNonlinear Optical Side Chain Polyimides Containing No Flexible Tether . . . , 28, pp. 4970–4974 (1995).

Miller, R.D. et al., *J. Chem. Soc., Chem. Commun.*, "Functionalized Azo Dyes by Direct Ullmann Coupling", pp. 245–246 (1995).

*Primary Examiner*—Philip Tucker

[57] ABSTRACT

The present invention relates to crosslinkable thermoplastic compositions comprising a plurality of crosslinkable moieties, capable of undergoing addition polymerization, incorporated by functionalization of the precursor poly (hydroxy ethers). The poly(hydroxy ethers) comprise recurring moieties derived from aromatic dihydroxy compounds. The crosslinkable polymeric compositions are crosslinked to obtain crosslinked thermoset polymeric compositions of the invention. The polymeric compositions of the inventions can be suitably used either as an active guiding layer, and/or as a NLO active upper and lower cladding layers in an electro-optic device. The polymeric compositions can also be used as non-NLO polymers for the upper and lower cladding layers, prior to orientation by the application of an electric field.

17 Claims, No Drawings

5,776,374

CROSSLINKABLE THERMOPLASTIC AND CROSSLINKED THERMOSET NONLINEAR OPTICAL POLYMERIC COMPOSITIONS DERIVED FROM AROMATIC DIHYDROXY COMPOUNDS

Statement of Government Interest

This invention was made with support of the United States Government under Contract F33615-93-C-5359 awarded by the Department of the Air Force. The Government has certain rights to this invention.

BACKGROUND OF THE INVENTION

This invention relates to crosslinkable thermoplastic and crosslinked thermoset nonlinear optical polymeric compositions derived from precursor poly(hydroxy ethers). The poly(hydroxy ethers) are derived from nonlinear optical active bisphenols. The polymeric compositions of the invention can be useful in the electro-optic devices as active guiding layers and/or as cladding layers.

Nonlinear optical (NLO) materials have been used in electro-optic devices for more efficient processing and transmission of information in the field of fiber optic communications. The NLO materials used in these devices have in general been inorganic crystals such as lithium niobate ($LiNbO_3$), or potassium dihydrogen phosphate (KDP). More recently, nonlinear optical materials based on organic molecules, in particular polar aromatic organic molecules, have been developed.

Organic nonlinear optical materials characteristically have large nonresonant susceptibilities, ultrafast response times, low dielectric constants, high-damage thresholds and intrinsic tailorability. The nonlinear optical response exhibited by organic materials with large delocalized n-electron systems is in many cases much larger than that shown by inorganic materials. In addition, organic materials can be easily fabricated into integrated device structures when used in polymer form.

Nonlinear optical polymers are generally cast as films on substrates by processes such as spin coating from a solution of the polymer in a solvent, spraying, Langmuir-Blodgett deposition, and the like. The substrate materials employed for electro-optic waveguides are generally inorganic materials such as silicon, GaAs, GaAlAs and the like. The fabrication of electro-optic devices from nonlinear optical polymers typically involves the deposition and drying of a plurality of layers of films on the substrate. A typical polymeric electro-optic waveguide device fabrication comprises, for example, deposition of a lower electrode layer, a lower cladding layer, an active guiding layer, an upper cladding layer, and an upper electrode layer. These layers are successively deposited and dried/cured, thus involving successive heating and cooling operations during the fabrication process.

The cladding layers help confine light in the active guiding layer of the device and isolate the guiding layer from poling and device operating electrodes. Therefore, the refractive index of the cladding polymers must be lower than that of the nonlinear optical polymer of the guiding layer. Typically, the difference in the refractive indices must be relatively small to optimize device performance. This is especially true for electro-optic modulators, which must support only a single optical mode.

Furthermore, the nonlinear optical activity of an electro-optic device is optimized when the applied electric field is localized across the active guiding layer and minimized across the cladding layers. This requires that the electrical resistivity of the cladding layer polymer be less than that of the active guiding layer polymer.

U.S. Pat. No. 4,936,645 describes a thin film waveguide electro-optic modulator in which the waveguiding polymer and each of the upper and lower organic cladding layers exhibit a second order nonlinear optical response. Each of the upper and lower cladding layers has an index of refraction between about 0.002–0.02 lower than the waveguiding polymer. The polymer comprising the thin waveguiding polymer film and the cladding layers is a blend of a polymer host and a guest chromophore. The nonlinear optical properties of the thin waveguiding film polymer and cladding polymers can be controlled by the guest component alone, or both the host and the guest components can exhibit nonlinear optical susceptibility.

U.S. Pat. No. 5,112,881 describes a process for preparing three-dimensional polymers from photocrosslinkable host polymer and guest NLO molecule functionalized with photosensitive chromophores, preferably through the hydroxyl groups present in the NLO molecule. The process involves spin coating a substrate from solutions of functionalized NLO molecules and the photosensitive polymers in organic solvent to form a thin film thereof. The films are poled to introduce noncentrosymmetry in the NLO molecules at the glass transition temperature of the polymer. The NLO molecules are then photocrosslinked with the host polymer, for example, by UV radiation to produce the three-dimensional polymers.

A guest-host system containing a crosslinkable NLO dye and a thermally-crosslinkable NLO epoxy-based polymer is described in "Novel Crosslinked Guest-Host System With Stable Second-Order Nonlinearity", R. J. Jeng et. al., *J. M. S. Pure Appl. Chem.*, A29(12), pp. 1115–1127 (1992). The host polymer is a functionalized epoxy polymer of diglycidyl ether of bisphenol A and 4-(4'-nitrophenylazo) phenylamine and contains 30 percent of the hydroxy group functionalized with acryloyl groups. A crosslinkable NLO dye, 2,4-acryloyloxy(4'-phenylazo nitobenzene) is processed and poled in the host NLO polymer matrix similar to a typical guest-host system and thermally crosslinked in the poled phase to increase the nonlinear optical chromophore concentration and the crosslinking density.

The optimization of the electro-optic devices utilizing organic polymeric materials thus requires consideration of various factors such as control of relative refractive indices of the NLO active guiding polymer layer and the cladding polymer layers; high NLO activity of the guiding layer polymer, and preferably of the cladding layers as well; thermooxidative stability of the NLO active guiding polymer; low optical propagation losses; control of relative electrical resistivities of the NLO active guiding layer polymer, and the cladding layer polymer; and the ease of fabrication in spin coating multiple layers of the polymers without cracking of the layers; and solvent resistance on lithographic processing. There is a continuing effort to provide materials which can be used to obtain optimum devices useful in commercial applications for longer periods of time than is currently possible.

It is an object of the invention to provide nonlinear optical polymeric compositions which can be used as nonlinear optical materials as well as cladding polymer layers to overcome some of the problems that currently exist in the state of the art.

SUMMARY OF THE INVENTION

In one aspect, the present invention relates to a crosslinkable thermoplastic nonlinear optically active polymeric composition comprising:

a plurality of crosslinkable moieties, capable of undergoing addition polymerization, incorporated by functionalization of a poly(hydroxy ether) comprising recurring moieties derived from a nonlinear optical compound of the formula:

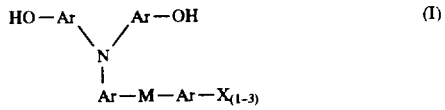

(I)

wherein Ar independently denotes an aromatic hydrocarbyl or a heterocyclic radical at each occurrence, M is a divalent conjugated group, and X is an electron-withdrawing group.

In another aspect, the present invention relates to a crosslinked thermoset nonlinear optical polymeric composition comprising crosslinked moieties obtainable by addition polymerization of a crosslinkable thermoplastic polymeric composition described above.

In yet still another aspect, the present invention relates to a process for preparing crosslinked thermoset nonlinear optical polymeric compositions comprising:

a) addition polymerization of a crosslinkable thermoplastic composition comprising:

a plurality of crosslinkable moieties, capable of undergoing addition polymerization, incorporated by functionalization of a poly(hydroxy ether) comprising recurring moieties derived from a nonlinear optical compound of the formula:

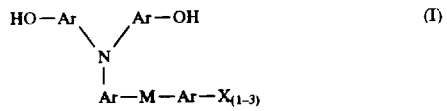

(I)

wherein Ar independently denotes an aromatic hydrocarbyl or a heterocyclic radical at each occurrence, M is a divalent conjugated group, and X is an electron-withdrawing group, and b) orienting the polymeric composition obtained in step (a) by applying an electric field.

The nonlinear optical crosslinkable thermoplastic polymeric compositions and the crosslinked thermoset nonlinear optical polymeric compositions, obtainable therefrom by addition polymerization, can be useful for their nonlinear optical activity and can be used as an active NLO guiding layer as well as upper and lower cladding layers in electro-optic devices, such as Mach-Zehnder modulators, for frequency conversion of laser light and related application in the fiber optic communication industry. It is believed that it will be possible to tailor relative refractive indices and relative electrical resistivities of the polymeric compositions of the invention for their use as active guiding layer and the cladding layers, respectively, and thereby optimize the device performance. The crosslinked polymeric compositions of the invention are expected to have high nonlinear optical activity upon orientation by application of an electric field and to possess superior thermooxidative and orientational stability.

DETAILED DESCRIPTION OF THE INVENTION

The term "crosslinkable thermoplastic polymer", as used herein, refers to polymers which are obtainable by functionalization of hydroxy groups in precursor poly(hydroxy ether) with crosslinkable moieties capable of undergoing addition polymerization to yield a three-dimensional network structure. The polymeric compositions of the invention will exhibit nonlinear optical properties when oriented by application of an electric field.

Precursor Poly(hydroxy ethers)

The poly(hydroxy ethers) are obtainable by condensation polymerization of aromatic dihydroxy compounds of Formula I, whereby the dihydroxy compounds are incorporated as recurring divalent moieties, forming the backbone of the polymers. The dihydroxy compounds of Formula I are described in a commonly assigned patent application filed even date herewith.

The term "aromatic hydroxy" as used herein refers to hydroxy groups that are directly attached to an aromatic ring.

Suitably Ar is a $C_6$-$C_{18}$ aromatic hydrocarbyl or a $C_4$-$C_{17}$ heterocyclic radical containing one heteroatom selected from sulfur, oxygen and nitrogen. Illustrative of the hydrocarbyl radicals are those derived from benzene, naphthalene and anthracene. Illustrative of the heterocylic radicals are those derived from furan, pyrrole, pyridine, thiophene and the like. Preferably, Ar is independently a phenylene group at each occurrence.

The term "electron-withdrawing", as employed herein, refers to any substituent which attracts the electrons from a conjugated electron structure, thereby providing a polarized resonating structure. A quantification of the level of electron-withdrawing capability is given by the Hammett σ (sigma) constant. This well known constant is described in many references, for instance, J. March, *Advanced Organic Chemistry*, McGraw Hill Book Company, New York, 1977 edition, pp. 251–259. The Hammett constant values are negative for electron-donating groups ($\sigma_p$=–0.66 for $NH_2$) and positive for electron-withdrawing groups ($\sigma_p$=0.78 for a nitro group, $\sigma_p$ indicating para substitution.)

Illustrative of the electron-withdrawing groups useful in the present invention include —$NO_2$, —$SO_2R$, —$SO_2CH_2F$, —$SO_2CHF_2$, —$SO_2CF_3$, —$S(NSO_2CF_3)CF_3$, —$CF_3$, —$CO_2R$, —$COCF_3$, —CN, cyanovinyl and dicyanovinyl, wherein R is a hydrogen or a $C_1$ to $C_{20}$ hydrocarbyl radical. Preferably, the electron withdrawing group is a nitro group.

The term "conjugated" group, as employed herein refers to a moiety containing alternate double or triple bonds which facilitates the charge transfer character of the excited state and allows for large differences in the dipole moments of the ground and excited states.

Illustrative divalent conjugated groups represented by M in the instant invention include: —C≡C—, —CR=CR—, —CR=CR—CR=CR—, —CR=N—, —N=CR—, and —N=N—, wherein R is as defined hereinbefore. Preferred conjugated groups are azo, ethylene and acetylene groups. More preferably, the conjugated group is an azo group.

Most preferably, the aromatic dihydroxy compound is an azobisphenol represented by the formula:

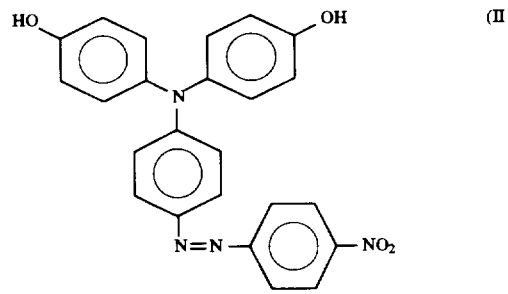

(II)

The aromatic dihydroxy compounds of the present invention are generally prepared by reacting an amine with a protected iodo aromatic hydroxy compound via Ullman reaction followed by deprotection of the aromatic hydroxy group. The methods are described in *Synthesis*, S. Gauthier and J. M. J. Frechet, p. 383, (1987); *Macromol Chem.*, Rudolf Zentel et al., 194, 859, 1993, p. 861; and *J. Chem. Phys.*, Wong et al., 100(9), 1994, pp. 6818–25.

Suitable amines include those represented by the general formula:

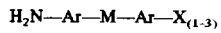

wherein Ar, M and X are as defined above.

Suitable protected aromatic iodo hydroxy compounds include those represented by the general formula:

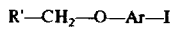

wherein R' is selected from the group consisting of hydrogen, $C_2$–$C_5$ alkyl, phenyl or phenyl substituted with a $C_1$–$C_6$ alkyl, and Ar is as defined above.

The aromatic dihydroxy compounds of the invention will exhibit nonlinear optical properties when subjected to a suitable poling force such as an electric field. Electric Field Induced Second-Harmonic Generation (EFISH(G)) is generally used to determine the dipole moment-hyperpolarizability product, µβ, of the dihydroxy compound. The methodology is described in B. F. Levine and C. G. Bethea, *J. Chem. Phys.*, 63 (1975), pp. 2666–2682, incorporated herein by reference.

Methods of producing poly(hydroxy ethers) are well known in the prior art and are suitable for use in forming the polymeric compositions of the present invention. Suitable methods for preparing poly(hydroxy ethers) are set forth in U.S. Pat. Nos. 2,602,075; 3,305,528; 4,647,648; and 5,089,588; in articles by Reinking, Barnabeo, and Hale published in *J. Appl. Polym. Sci.*, 7, pp. 2135–2160 (1963); and in the *Encyclopedia of Polymer Science and Technology*, vol. 10, pp. 111–122; all of which are incorporated herein by reference.

The poly(hydroxy ethers) can be homopolymers containing divalent moieties derived from the dihydroxy compounds in the backbone of the polymer, or copolymers having at least one other comonomer condensation copolymerized therewith.

The comonomers employed are generally bisphenols known in the art and diglycidyl ethers thereof. The comonomers can also be diglycidyl ethers of the aromatic hydroxy compounds of the invention prepared therefrom by methods known in the art.

Typical of some of the known bisphenols that are advantageously employed are bis(hydroxyphenyl)fluorene, bis(4-hydroxyphenyl)methane, 1,1-bis(4-hydroxy-phenyl)-1-phenylethane, 2,2-bis(4-hydoxyphenyl)propane (also commonly known as bisphenol A), 2,2-bis(4-hydroxy-3-methylphenyl)propane, 4,4-bis(4-hydroxyphenyl)heptane, 2,2-bis(4-hydroxy-3,5-dichlorophenyl)propane, 2,2-bis(4-hydroxy-3,5-dibromophenyl)propane, resorcinol, hydroquinone, 4,4'-dihydroxydiphenylethylmethane, 3,3'-dihydroxydiphenyl-diethylmethane, 3,4'-dihydroxydiphenylmethylpropylmethane, 4,4'-dihydroxydiphenyloxide, 4,4'-dihydroxydiphenyl-cyanomethane, 4,4'-dihydroxydiphenyl, 4,4'-dihydroxybenzophenone (bisphenol K), 2,6-dihydroxynaphthalene, 1,4'-dihydroxynaphthalene, and catechol; dihydroxyphenyl ethers such as bis(4-hydroxyphenyl)ether, bis(3,5-dichloro-4-hydroxyphenyl)ether; dihydroxy biphenyls such as 4,4'-dihydroxybiphenyl,3,3'-dichloro-4,4'-dihydroxy biphenyl, 2,2'-6,6'-tetrabromo-3,3',5,5'-tetramethyl-4,4'-dihydroxybiphenyl; dihydroxyaryl sulfones such as bis(4-hydroxyphenyl)sulfone, bis(3,5-dimethyl-4-hydroxyphenyl) sulfone; and dihydroxy biphenyl sulfides and sulfoxides such as bis(4-hydroxy-phenyl)sulfide and bis(4-hydroxyphenyl)sulfoxide, 4,4'-dihydroxydiphenyl sulfone; and mixtures thereof. Other dihydric phenols are listed in U.S. Pat. Nos. 3,395,118; 4,438,254 and 4,480,082, which are hereby incorporated by references. The diglycidyl ethers are derived from the bisphenols listed above.

The nonlinear optical properties and the refractive indices of the crosslinkable polymeric compositions will be dependent upon the mole ratio of the comonomer to the dihydroxy compound of the invention in the precursor poly(hydroxy ethers). Therefore, the desired mole ratio will depend on the desired ultimate use of the polymer in an electro-optic device, i.e., whether the polymer is to be employed as an active layer or as a cladding layer in the device. It is believed that increasing the mole ratio of the NLO dihydroxy compound to the comonomer will result in higher NLO activity and higher refractive index.

The mole ratio of the comonomer to the dihydroxy compound to be employed generally will vary in range from 90:10 to 10:90. The preferred mole ratio is believed to be in the range of 60:40 to 10:90, and the most preferred mole ratio is believed to be in the range of 50:50 to 20:80.

Crosslinkable Thermoplastic Polymers

The crosslinkable thermoplastic polymers of the invention are obtainable by functionalization of the above-described poly(hydroxy ethers) with crosslinkable moieties capable of undergoing addition polymerization to provide three-dimensional crosslinked network structure. The crosslinkable thermoplastic polymers obtained by functionalization of poly(hydroxy ethers) derived from dihydroxy compounds are described in a commonly assigned application filed even date herewith.

Possible crosslinkable moieties include acetylene, allyl, styryl, acrylate, methacrylate, propargyl, and arylcyclobutene.

The "level of functionalization" in the crosslinkable thermoplastic polymeric composition, as used herein, is defined as the ratio of crosslinkable moieties per polymer repeat unit of the crosslinkable thermoplastic polymer to the total number of hydroxy groups per polymer repeat unit of the precursor poly(hydroxy ether). The level of functionalization is expressed as percent functionalization in the crosslinkable polymer.

It is possible to obtain from partially to essentially completely functionalized crosslinkable polymers from their precursor polymers. The ability to alter the percent functionalization in the crosslinkable thermoplastic polymers will allow for advantageous modification of the electrical and optical properties of the polymers of the invention and thereby optimize the performance of the electro-optic devices fabricated from the polymers. It is expected that increasing the level of functionalization generally will result in lowering of the refractive indices and the electrical resistivities of the crosslinked thermoset polymers obtained by addition polymerization of the crosslinkable thermoplastic polymers.

The functionalization of the poly(hydroxy ethers) can generally be achieved by reacting anhydrides of the carboxylic acids containing the desired crosslinkable moieties with a solution of the poly(hydroxy ether) in a suitable solvent, preferably, in the presence of a basic catalyst. The reaction can generally be carried out at temperatures in the range from about -20° C. to about 150° C., and preferably in the range of about 0° C. to 80° C. It can most preferably be carried out at ambient temperature. The reaction can be carried out over time periods ranging from 30 minutes to 48 hours, and is preferably carried out over a time period ranging from about 8 hours to about 24 hours.

Preferably, the poly(hydroxy ethers) can be functionalized with acrylate or methacrylate by reacting acryloyl or methacryloyl anhydride with a solution of the polymer in a suitable solvent.

To achieve the desired functionalization of the hydroxy groups in the precursor poly(hydroxy ether), more than the theoretical optimum amount of anhydride will be required to offset the loss of the reactivity of the anhydride due to the presence of adventitious water or other proton sources. For example, while a mole ratio of 2:1 of hydroxy group to anhydride is expected to provide a polymer with 50 percent level of functionalization; in practice, a mole ratio of 1:1 of hydroxy groups to anhydride will be required to achieve 50 percent level of functionalization.

To prepare essentially completely functionalized polymers, in which the ratio of crosslinkable functional groups to the hydroxy groups in the precursor poly(hydroxy ether) will be about 1.0, the mole ratio of hydroxy groups to anhydride employed will be from about 1:5 to about 1:50.

Suitable solvents for the functionalization include, for example, pyridine, tetrahydrofuran, diglyme, dimethylformamide, dimethylacetamide, n-methylpyrrolidinone, or any aprotic solvent capable of dissolving the polymer.

Suitable basic catalysts include, for example, pyridine, and tertiary amines such as triethylamine, benzyldimethylamine and the like.

The crosslinkable thermoplastic polymers of the invention can be fabricated into thin films by methods well known to those skilled in the art. Polymer films are typically fabricated by spin-coating or dip-coating a polymer solution onto a substrate. The substrate used depends on the testing and/or device requirements. Typical substrates include glass, indium-tin-oxide (ITO) coated glass, and silicone wafers.

Crosslinked Thermoset Polymers

The crosslinked thermoset polymers of the invention can be prepared by the addition polymerization of the crosslinkable moieties in the crosslinkable thermoplastic polymeric compositions, whereby a three-dimensional network structure is obtained. Depending on the reactivity of the crosslinkable moiety used, polymerization can be initiated by methods known to those skilled in the art. These methods include initiation by thermal radiation, photochemically by free radicals, or by electromagnetic radiation. Examples of electromagnetic radiation which can be used for activation include microwave, infrared, ultraviolet, electron beam, or gamma radiation. Thermal or photochemical polymerization can optionally be achieved in the presence of an initiator, such as an azo compound, a peroxide, and the like.

Preferably, the crosslinking can be achieved thermally without an added free radical initiator, by heating the polymer film at elevated temperatures for periods ranging between about 0.1 to about 6 hours, preferably from about 0.5 to about 3 hours, and most preferably for about 1 hour. Preferably, the temperature employed is between about 180° C. to 250° C. The temperature employed during the polymerization is generally between about 25° C. to about 300° C., when a free radical initiator is used.

Poling of the Polymer Films

The polymeric compositions of the invention can be used as non-NLO active materials for the upper and lower cladding layers prior to orientation by the application of an electric field. The polymeric compositions of the invention can also be used as active NLO materials either for the active guiding layer and/or for the cladding layers. The polymer must be oriented to obtain a non-centrosymmetric alignment of the dipolar segments throughout the bulk of the polymer film, when it is desired that the polymeric composition be used as an active guiding layer or as a NLO cladding layer. This is achieved by poling the film, or applying an electric field across the film. In corona poling, the field results from a discharge between a wire, such as tungsten, suspended above the film and a grounded heater block. The corona poling technique is described further by M. A. Mortazavi et al., *J. Opt. Soc. Am.*, B 6 (1989). In parallel plate poling, a voltage is applied across the two electrode layers. A substrate with an electrically conductive overlayer is applied on the top of the polymer film, such as sputter-coated gold. The poling field in parallel plate poling is usually about 10 to 300 V/μm. The preferred range is about 50 to 200 V/μm.

Poling can be accomplished either after the crosslinked thermoset polymers are obtained as described above, or it can be accomplished simultaneously while the crosslinkable thermoplastic polymers undergo the crosslinking reaction described above.

Preferably, poling is achieved after the crosslinking reaction has occurred. In such a case, the poling field is typically applied at an elevated temperature, near the polymer Tg (approximately about 5 to 20 degrees above the onset of Tg as measured by differential scanning calorimetry (DSC)). The field is left on for at least a few minutes and the sample is cooled with the field on to maintain the orientation of the dipolar segments.

For simultaneous poling and crosslinking of the crosslinkable thermoplastic polymer, the poling field is applied to the film before the crosslinking reaction has taken place. The poling field is initially applied at room temperature and the film is then ramped to the poling and crosslinking temperature. This temperature typically ranges from about 5 degrees below polymer Tg to about 300° C. The poling field and the temperature are left on for about 0.5 to about 3 hours, preferably for about 1 hour. After this time, the sample is cooled with the field on to maintain the orientation of the dipolar segments in the thermoset polymers.

The oriented films fabricated from the polymers of this invention can be characterized for their NLO activity by electro-optic measurements described below.

Electro-optic Measurements

The electro-optic coefficients ($r_{33}$) of the poled NLO polymers are measured using a thin film reflection technique as taught by C. C. Teng and H. T. Man (*Appl. Phys. Lett.*, 1990, 56(18), pp. 1734–1736) and *Quantum Electronics*, Amnon Yariv John Wiley and Sons. pp. 339–441 (1975). The basis for the measurement is that the modulated phase shift of light due to an applied field by the linear electro-optic effect in the material is related to a phase shift imparted by a Soleil-Babinet compensator. The $r_{33}$ value can be calculated using the equation given by Y. Levy; M. Dumont; E. Chastaing; P. Robin; P. A. Chollet; G. Gadret; and F. Kajzar (*Mol. Cryst. Liq. Cryst. Sci. Technol.—Sec. B: Nonlinear Optics*, 1993, 4, pp. 1–19):

$$r_{33} = \frac{3\lambda I_m (n^2 - \sin^2\theta)^{1/2}}{4\pi V_m I_c n^2 \sin^2\theta}$$

where $\lambda$ is the wavelength of light, $I_m$ is the intensity of the modulated light signal, n is the refractive index of the polymer, $\theta$ is the angle of incidence, $V_m$ is the amplitude of the applied voltage sine wave, and $I_c$ is the unmodulated light intensity at the intensity half point corresponding to a $\pi/2$ phase shift by the Soleil-Babinet compensator.

Refractive Index Measurements

Refractive indices are measured by using a prism coupling/waveguiding method described by R. Ulrich (*J. Opt. Soc. Amer.*, 60(10), 1970, pp. 1337–1350) and P. K. Tien and R. Ulrich (*J. Opt. Soc. Amer.*, 60(10), 1970, pp. 1325–1337). This method entails coupling light into the various waveguiding modes in a thin polymer film. These modes are critically dependent on the refractive index and thickness of the film, the substrate on which the film is formed and other optical parameters, such as the prism refractive index and angle. Once these parameters are known, and the coupling angles are measured, the index and thickness of the film can be mathematically extracted.

Several laser sources can be used, but typically laser diodes are used as the excitation source. These sources are polarization controlled using waveplates and polarizers if necessary. This enables the measurement of both in plane (TE) and out of plane (TM) refractive indices. The prism (45°-90°-45°) is made from SF6 glass (Karl Lambrecht) and is housed in a home-built jig. The film is placed under the prism on a flat surface. The prism is carefully lowered onto the film until optical contact is made as evidenced by the appearance of a wet spot near the 90° corner of the prism. A nylon screw is positioned from the back side of the plate holding the film and substrate and can be used to place pressure on the film/prism gap. Once the prism is contacted to the film, the entire assembly is mounted vertically on a precision rotation stage (Newport). The prism is positioned approximately near the rotation axis of the stage. The laser beam is also positioned so that it intersects the stage rotation axis. As the stage is rotated, at the appropriate angles, light will be launched into the film and will appear as a bright stripe across the film. The appearance of this stripe is monitored by a fiber optic probe placed in close proximity to the film. The output of the probe is directed into a detector, lock-in amplifier and computer recording system. The laser beam is chopped with a blade chopper which acts as the reference to the lock-in amplifier. The jig holding the substrate, film, and prism is mounted on an XYZ translation stage so that the prism can be precisely positioned with respect to the rotation axis. The aim is to keep the laser beam directed onto the 90° corner of the prism as the rotation is performed (see Ulrich).

After the initial alignment, a mode scan is run. The angles are defined with reference to the reflection off of the hypotenuse face of the prism which is defined as 0°. Scans are recorded with the intensity of scattered light monitored by the fiber optic probe, plotted versus the angle of the stage. When modes are excited, the scattering drastically increases. The peak positions of the scattering are the coupling angles which are used in the mathematical fit. The fitting procedure employed is that described by J. D. Swalen; M. Tacke; R. Santo; and J. Fischer (*Optics Comm.*, 1976, 18(3), 387–390). To get both the refractive index and thickness of a film, at least two modes must be observed.

Triple Stack

A triple stack is a structure which can be fabricated into an electro-optic device, using the polymeric compositions of the invention. The triple stack comprises a substrate which is coated successively with at least three layers of films by methods known in the art and as described above. The three layers comprise an active guiding layer sandwiched between the two cladding layers, an upper and a lower cladding layer. A bottom cladding layer contiguous to the substrate is first deposited on the substrate. An active guiding polymer layer is then coated onto the bottom cladding layer. An upper cladding layer is then coated on to the guiding layer. At least one of the layers of the triple stack can comprise the polymeric composition of the invention. The active guiding polymer layer must comprise a nonlinear optical material, which may be the nonlinear polymeric composition of the invention. The cladding layers may optionally comprise a nonlinear optical material, which may be the nonlinear optical polymeric composition of the invention.

The following preferred specific embodiments are to be construed as merely illustrative, and not limitative of the remainder of the disclosure in any way whatsoever.

EXAMPLE 1

Synthesis of 4'-(4-Nitrophenylazo)-N,N-bis(4-hydroxyphenyl)aniline (BHPD)

The synthesis of BHPD involves three steps as follows:

EXAMPLE 1A

Synthesis of 4-(Benzoxy)iodobenzene (1)

To a 500 mL 3-necked flask equipped with reflux condenser, addition funnel, nitrogen inlet and magnetic stirring was added 50.0 g (0.277 mol, 1.0 eq.) 4-iodophenol (Aldrich), 37.69 g (0.2727 mol, 1.2 eq.) potassium carbonate (Fischer) and 250 mL dimethylformamide (DMF) and the mixture was heated to 65° C. for 20 minutes. To the addition funnel was added 48.61 g (0.284 mol., 1.25 eq) benzylbromide (Aldrich) and 50 mL DMF. The heat was turned off and the contents of the addition funnel were added dropwise over 15 minutes during which time an exotherm to 75° C. was produced with salt formation. Heating was resumed at 45° C. for an additional 20 hours after which liquid chromatography (LC) indicated complete conversion. The mixture was poured onto ice and extracted with $Et_2O$, dried over sodium sulfate ($Na_2SO_4$), reduced in vacuo and recrystallized from ethanol giving 44.2 g of 1 as tan crystals (m.p.=55°–56° C.) in 63 percent isolated yield (99 percent by LC). It had the following spectral properties. $^1H$ NMR (250 MHz, $CDCl_3$): $\delta$4.82 (s,2H), 6.54 (d), 7.12–7.2 (m), 7.34 (d). $^{13}C$ NMR (63 MHz, $CDCl_3$: $\delta$70.1, 117.3, 127.4, 128.1, 128.6, 136.5, 138.2, 158.7. HRMS m/z (EI) calcd (found) for $C_{13}H_{11}OI$=309.9855 (309.9851).

EXAMPLE 1B

Synthesis of 4'-(4-Nitrophenylazo)-N,N-bis(4-benzyloxyphenyl)aniline (2)

To a 500 mL 3-necked flask equipped with Dean-Stark distillation head, nitrogen inlet and mechanical stir was added 43.3 g (0.1392 mol, 3.0 eq.) of benzylether 1 from Example 1A, 11.241 g (0.0464 mol. 1.0 eq.) of 4'-(4-nitrophenyl-azo)aniline (Disperse Orange 3, Aldrich), 11.79 g (0.1856 mol, 4.0 eq.) of copper powder, 51.3 g (0.3712 mol. 8.0 eq.) of potassium carbonate ($K_2CO_3$) (Fischer), 2.453 g (9.28 mmol. 0.2 eq.) 18-crown-6 (Aldrich) and 100 mL dichlorobenzene. The mixture was heated to strong reflux (180°–183° C.) and monitored by LC. After 24 hours, no further change in product distribution was observed. The mixture was allowed to cool to room temperature and 100 mL water, and 200 mL diethylether ($Et_2O$) were added and the contents were allowed to stir for 2 hours then filtered over alumina ($Al_2O_3$). The filtrate was washed with 5×500 mL water, dried over magnesium sulfate ($MgSO_4$), filtered and reduced in vacuo giving 27 g crude 2 as a dark red oil. Recrystallization from acetonitrile gave 2 as a red powder (m.p. 85°–90° C.) in ca. 68 percent isolated yield (ca. 88 percent by LC). Dibenzyl ether 2 was taken on to the next step without further purification. It had the following spectral properties. $^1H$ NMR (250 MHz, $CDCl_3$): δ5.08 (s, 4H), 6.75 (d), 6.8 (d), 7.14(d), 7.4 (m), 7.52 (d), 7.78 (d), 7.93 (d), 8.31 (d). $^{13}C$ NMR (63 MHz, $CDCl_3$): δ70.4, 115.98, 117.3, 118.0, 122.8, 124.7, 125.9, 127.4, 127.5, 127.8, 128.1, 128.6, 136.8, 138.3, 139.4, 145.9, 147.8, 152.7, 156.4. HRMS m/z (EI) calcd (found) for $C_{31}H_{23}N_4O_4$=515.1719 (515.1741).

EXAMPLE 1C

Synthesis of 4'-(4-Nitrophenylazo)-N,N-bis(4-hydroxyphenyl)aniline (BHPD) (3)

To a 500 mL flask equipped with a nitrogen inlet and a magnetic stir was added 20 g (0.033) dibenzyl ether 2 from Example 1B and 330 mL (0.3M) trifluoroacetic acid (Aldrich). The dark blue mixture was allowed to stir at room temperature for 48 hours after which all of 2 had been consumed as measured by LC in addition to one minor impurity (monobenzyl ether). The reaction was quenched with 1 L ice water and the bisphenol was extracted into 300 mL $Et_2O$. The organic layer was washed 2×100 mL $H_2O$ 5×100 mL aq. sodium bicarbonate (sat.) and 2×100 mL $H_2O$ dried over $MgSO_4$, filtered and reduced in vacuo giving ca. 20 g crude 3 as a dark red powder (ca. 60 percent by LC). All attempts at recrystallization failed and the two components were separated by high pressure flash chromatography (Biotage) on silica with $CH_3CN/CH_2Cl_2$ (20/80 percent) TLC $\Delta R_f$=0.119) giving 3.2 g of BHPD as a red powder (m.p. 237°–240° C.) in 25 percent isolated yield (99+ percent by LC). It had the following spectral properties. $^1H$ NMR (250 MHz, DMSO-$d_6$): δ6.7 (d,2H), 6.82 (d,4H), 7.1 (d,4H), 7.75 (d,2H), 7.91 (d, 2H), 8.32 (d,2H), 9.55 (d, 2H, OH). $^{13}C$ NMR (63 MHz, DMSO-$d_6$): δ115.5, 116.5, 122.6, 124.9, 125.5, 128.4, 136.6, 144.3, 147.4, 153.1, 155.6, 156.9. GCMS (EI) m/z calcd (found) for $C_{24}H_{18}N_4O_4$=426 (426 w/276 at 100 percent).

EXAMPLES 2 AND 3

Prepare the 100 percent and 50 percent functionalized crosslinkable thermoplastic polymers from the precursor poly(hydroxy ether) as described in Examples 2 and 3, respectively. The poly(hydroxy ether) is obtained from condensation polymerization of 50:50 molar ratio of diglycidyl ether of 9,9-bis(4-hydroxyphenyl)-fluorene (BHPF) and the NLO BHPD obtained in Example 1.

EXAMPLE 2

Charge a 1,000 mL 3-neck flask, equipped with stir bar, with the poly(hydroxy ether) (30.00 g, 29.4 mmol of repeat units of the polymer) prepared according to the general procedure of Example 25 of U.S. Pat. No. 5,208,299. Add pyridine (250 mL) and stir the mixture until the polymer dissolves. Add methacrylic anhydride (250 mL, 258.8 g, 1.68 moles) and stir the mixture at room temperature overnight. Pour the solution into methanol (2,000 mL) and collect the product by suction filtration. Redissolve the product in THF (250 mL) and precipitate into methanol (2,000 mL). Collect the product by suction filtration and dry in a vacuum oven at room temperature overnight. Crosslink the sample by heating in the DSC pan at 225° C. for 60 minutes. Remove the sample from the pan and shake with THF for 2 hours.

EXAMPLE 3

Charge a 250 mL 3-neck flask, equipped with stir bar, with (10.0 g, 9.8 mmol) of the poly(hydroxy ether), prepared in the manner described in Example 1. Add pyridine (100 mL), and stir the mixture until the polymer dissolves. Add methacrylic anhydride (2.93 mL, 3.03 g, 19.66 mmol) via syringe and stir the mixture at room temperature overnight. Pour the solution into methanol (500 mL) in a Waring blender, and collect the resultant precipitate by suction filtration. Slurry the precipitate in methanol (800 mL) and stir at room temperature overnight. Collect the product by suction filtration and redissolve in tetrahydrofuran. Pour the solution into methanol (800 mL). Collect the product by suction filtration and dry it in a vacuum oven at room temperature overnight. Crosslink the polymer by first heating to 250° C. at 10° C./minute, cooling to 50° C., then reheating at 10° C./minute to 250° C.

Film Preparation, Crosslinking and Poling

Spin coat a polymer solution comprised of the crosslinkable polymer from Example 2 and cyclohexanone (20 percent weight/volume) onto a patterned ITO coated glass substrate at a spin speed of 1,000 rpm for 25 seconds. Crosslink the sample by air drying for 18 hours, oven drying at 100° C. for 2 hours in nitrogen, oven drying at 100° C. for 2 hours in vacuum, oven drying at 150° C. for 1 hour in vacuum, and oven drying at 225° C. for 1 hour in nitrogen. Deposit an electrode composed of 25 nm thickness of gold on the sample by DC sputtering. Pole the sample at 225° C. in air for 5 minutes with 370 volts (+ electrode to ITO) to yield an applied electric field of 100 V/μm. Cool the sample with the field on to 30° C.

Electro-optic Coefficient Measurement

Calculate the electro-optic coefficient measurements by using the technique described above on pp. 19.

Use a Lasermax Model LAS-300-830-15 830 nm diode laser as the light source. Use a Stanford Research Systems Model SR540 Chopper Controller to chop the light at 1030 Hz and to drive the voltage wave applied to the sample. Generate a 10 V voltage sine wave by a BK Precision Dynascan Corp 3030 Sweep Function Generator and amplify by a Lasermetrics Model AF3 amplifier. Use an EG&G Princeton Applied Research Corporation Model 124A Lock-in Amplifier and Model 116 Differential Amplifier to record the unmodulated light signal ($I_c$) and the modulated EO signal ($I_m$) from an amplified photodiode. The ratio of rms voltages from the lock-in amplifier needs to be corrected by a factor of 2/π to yield a ratio of sine wave amplitudes ($I_c/I_m$). Alternatively, the unmodulated light signal ($I_c$) can be measured with a DC voltmeter without chopping the beam, and the voltage amplitude ($I_c$) is measured directly.

Measure the applied voltage signal ($V_m$) from the rms voltage using a digital voltmeter and a conversion to amplitude using a factor of √2. Use values of 10–12 V. For these voltages, minimize the signal from the sweep generator and employ a 10 dB attenuator on the amplifier. Translate a Melles Griot Soleil-Babinet compensator to vary the phase of the light to yield a half intensity point (typically 60 to 100 mV) of the chopped incident light. Remove the chopper from the beam path and apply the 10–12 V sine wave to the sample yielding a 5–40 μV signal. Determine the $r_{33}$ values assuming an index of refraction of 1.668 and a reflection angle of 45°. Measure the $r_{33}$ values at a second half intensity point on the other side of the chopped signal maximum, yielding similar $r_{33}$ values.

Refractive Index Measurements

Crosslink the crosslinkable polymers of Examples 2 and 3 by successively oven drying at 100° C. in nitrogen for 2 hours, in a vacuum at 100° C. for 2 hours, in vacuum at 150° C. for 1 hour, and at 225° C. in nitrogen for 1 hour. Measure refractive indices of the crosslinked polymers by the technique described above at pp. 20–21.

Electrical Resistivity Measurements

Measure electrical resistivities as volume resistivities in the manner described below. Spin coat the crosslinkable polymers from Examples 2 and 3 on an ITO patterned glass substrate, dry and crosslink. Apply a gold electrode on top of the film by sputtering to give an electrode intersection area of approximately 35 mm². Place the samples on a heater block in a nitrogen purged vacuum oven and connect in series to the power supply (Bertan Associates Model 230-01R) and electrometer (Keithley Instruments Model 610C). Connect the ITO and gold electrodes to the power supply positive and negative leads, respectively.

Measure volume resistivities by applying the electric field of 50 V/um at room temperature and ramping the sample at about 10° C./min to about 10° C. above the polymer Tg. Allow the samples to equilibrate for about 10 minutes and then measure the current as the sample temperature is decreased. This process eliminates contributions from charging phenomena which are often observed in these types of systems. Control the thermal program by a LFE Instruments Model 2010 temperature control unit. Insert a firerod into the center of the heater block and connect to the temperature control unit used as the heat source. Use an Omega cement-on, fast response thermocouple (Model C01-K) to monitor the temperature. Cement it to the heater block using Aremco Products, Inc. high thermal conductivity adhesive (Aremco Bond 568).

The volume resistivity (ρ), in Ω-cm, is calculated by using the equation:

$$\rho = \frac{V \times A}{i \times t}$$

V=applied voltage in volts
A=electrode area in cm²
i=current in amps

What is claimed is:

1. A crosslinkable thermoplastic nonlinear optical polymeric composition comprising:
   a) a plurality of crosslinkable moieties incorporated by functionalization of poly(hydroxy ether), wherein the poly(hydroxy ether) comprises moieties derived from a nonlinear optical compound represented by the formula:

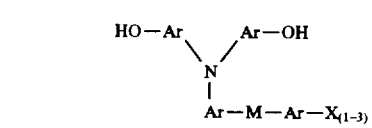

wherein Ar independently denotes a $C_6$–$C_{18}$ aromatic hydrocarbyl or a $C_4$–$C_{17}$ heterocyclic radical containing one heteroatom selected from sulfur, oxygen and nitrogen at each occurrence, M is a divalent conjugated group selected from the group consisting of —C≡C—, —CR=CR—, —CR=CR—CR=CR—, —CR=N—, —N=CR—, and —N=N—, wherein R is a $C_1$ to $C_{20}$ hydrocarbyl radical, and X is an electron withdrawing group selected from the group consisting of —NO₂, —SO₂R, —SO₂CH₂F, —SO₂CHF₂, —SO₂CF₃, —S(NSO₂CF₃)CF₃, —CF₃, —CO₂R, —COCF₃, —CN, cyanovinyl, and dicyanovinyl, wherein R is as given above.

2. The nonlinear optical polymeric composition of claim 1, wherein X is —NO₂.

3. The nonlinear optical polymeric composition of claim 1, wherein M is an azo group.

4. The nonlinear optical polymeric composition of claim 1, wherein Ar denotes a phenylene group at each occurrence.

5. The nonlinear optical polymeric composition of claim 1, wherein the poly(hydroxy ether) further comprises a comonomer condensation copolymerizable with the nonlinear optical compound.

6. The crosslinkable composition of claim 5, wherein the crosslinkable moieties are selected from the group consisting of acetylene, allyl, styryl, acrylate, methacrylate, propargyl, and arylcyclobutene.

7. The crosslinkable composition of claim 6, wherein the crosslinkable moiety is acrylate or methacrylate.

8. The nonlinear optical polymeric composition of claim 7, wherein the organic compound is represented by the Formula:

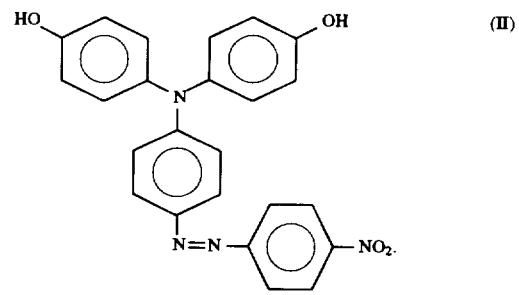

9. A crosslinked thermoset nonlinear optical polymeric composition comprising crosslinked moieties obtained by addition polymerization of a crosslinkable thermoplastic polymer, wherein the crosslinkable polymer comprises:
   a plurality of crosslinkable moieties, capable of undergoing addition polymerization, incorporated by functionalization of a poly(hydroxy ether) comprising recurring moieties derived from a nonlinear optical compound of formula:

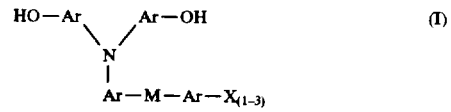

wherein Ar independently denotes a $C_6$–$C_{18}$ aromatic hydrocarbyl or a $C_4$–$C_{17}$ heterocyclic radical containing one heteroatom selected from sulfur, oxygen and nitrogen at each occurrence. M is a divalent conjugated group selected from the group consisting of —C≡C—, —CR=CR—, —CR=CR—CR=CR—, —CR=N—, —N=CR—, and —N=N—, wherein R is a $C_1$ to $C_{20}$ hydrocarbyl radical, and X is an electron withdrawing group selected from the group consisting of —$NO_2$, —$SO_2R$, —$SO_2CH_2F$, —$SO_2CHF_2$, —$SO_2CF_3$, —$S(NSO_2CF_3)CF_3$, —$CF_3$, —$CO_2R$, —$COCF_3$, —CN, cyanovinyl, and dicyanovinyl, wherein R is as given above.

10. The crosslinked composition of claim 9, wherein the poly(hydroxy ether) further comprises a comonomer condensation copolymerizable with the nonlinear optical compound.

11. The crosslinked composition of claim 10, wherein the crosslinkable moieties are selected from the group consisting of acetylene, allyl, styryl, acrylate, methacrylate, propargyl, and arylcyclobutene.

12. The crosslinked composition of claim 11, wherein the crosslinkable moiety is acrylate or methacrylate.

13. The crosslinked composition of claim 12, wherein the organic compound is represented by the formula:

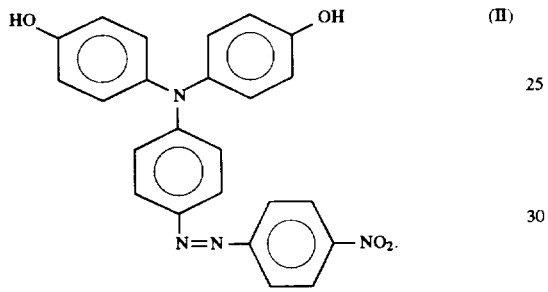

(II)

14. A process for preparing crosslinked thermoset nonlinear optical polymeric compositions comprising:
 a) addition polymerization of a crosslinkable thermoplastic composition comprising:
 a plurality of crosslinkable moieties, capable of undergoing addition polymerization, incorporated by functionalization of a poly(hydroxy ether) comprising recurring moieties derived from a nonlinear optical compound of the formula

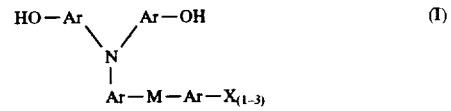

(I)

wherein Ar independently denotes a $C_6$–$C_{18}$ aromatic hydrocarbyl or a $C_4$–$C_{17}$ heterocyclic radical containing one heteroatom selected from sulfur, oxygen and nitrogen at each occurrence, M is a divalent conjugated group selected from the group consisting of —C≡C—, —CR=CR—, —CR=CR—CR=CR—, —CR=N—, —N=CR—, and —N=N—, wherein R is a $C_1$ to $C_{20}$ hydrocarbyl radical, and X is an electron withdrawing group selected from the group consisting of —$NO_2$, —$SO_2R$, —$SO_2CH_2F$, —$SO_2CHF_2$, —$SO_2CF_3$, —$S(NSO_2CF_3)CF_3$, —$CF_3$, —$CO_2R$, —$COCF_3$, —CN, cyanovinyl, and dicyanovinyl, wherein R is as given above; and b) orienting the polymeric composition obtained in step (a) by applying an electric field.

15. The process of claim 14, wherein the addition polymerization is carried out thermally.

16. A device comprising the crosslinkable nonlinear optical polymeric composition of claim 1.

17. A device comprising the crosslinked nonlinear optical polymeric composition of claim 9.

* * * * *